United States Patent

[11] 3,590,149

[72] Inventor John H. Harshbarger
Xenia, Ohio
[21] Appl. No. 875,442
[22] Filed Nov. 10, 1969
[45] Patented June 29, 1971
[73] Assignee Visual Information Institute, Inc.
Xenia, Ohio

[54] TELEVISION TEST INSTRUMENT
14 Claims, 5 Drawing Figs.

[52] U.S. Cl. .......... 178/6, 328/187
[51] Int. Cl. .......... H04n 3/00
[50] Field of Search .......... 178/6, 6.8, 5.4, 169.5; 331/20, 52; 328/187, 188, 189

[56] References Cited
UNITED STATES PATENTS
3,483,479 12/1969 Harshbarger .......... 331/52

*Primary Examiner*—Robert L. Griffin
*Assistant Examiner*—Barry Leibowitz
*Attorney*—Melvin A. Crosby

ABSTRACT: Television test instrument for developing test patterns by modulating the lines of a television raster, particularly for creating dot and bar patterns in which multivibrators are provided for creating the signals for the patterns which include components for permitting shifting of the developed pattern substantial distances and for synchronizing the developed pattern with the horizontal rate pulses and vertical blanking pulses.

INVENTOR.
JOHN H. HARSHBARGER
BY

INVENTOR.
JOHN H. HARSHBARGER
BY
Melvin A. Crosby

INVENTOR.
JOHN H. HARSHBARGER
BY

TELEVISION TEST INSTRUMENT

RELATED APPLICATION

Inventor, John H. Harshbarger, Ser. No. 672,058, filed, Oct. 2, 1967; title, SIGNAL GENERATOR.

It has been common practice in the past to use a television camera as a signal source for testing equipment by directing the camera toward a rendition of the desired test pattern. The signals developed by the camera were then employed for determining the adjustment of the television equipment. Signals obtained in this manner, however, are limited and inconsistent and vary with the normally wide variations in camera tubes, video amplifier response, the amount and quality of the test pattern illumination, the parameters of the camera optics, and other variables. It is also quite difficult with an arrangement of the nature referred to to obtain a linear grey scale in the reproduced pattern due to inherent nonlinearity of response in camera tube pickups.

The arrangement of the present invention avoids the foregoing difficulties by developing standard predetermined reproducible and consistent pattern signals by electronic circuitry. The signals produced are free of noise and interference and permits the reliable testing of television system components such as amplifiers and monitors and the like without requiring the provision of a camera, optics, printed test patterns, artwork, or the like.

With the foregoing in mind, a primary objective of the present invention is the provision of an improved test signal generator for use with television equipment.

A particular object of the present invention is the provision of a generator of the nature referred to especially adapted for use with closed circuit television systems.

A further object of the present invention is the provision of a signal generator for developing test patterns for testing television equipment in which the patterns are precise and reproducible.

A further particular object of the present invention is the provision of a test signal generator of the nature referred to in which the generator includes adjustment such that the test pattern can be shifted on the screen of the device being tested so as to bring it into registration with a mechanical reproduction of the test pattern.

This invention relates to television test equipment and is particularly concerned with a test signal generator especially adapted for use on closed circuit television equipment but not necessarily limited thereto.

Television equipment must be carefully adjusted in order to provide for faithful reproduction of the material or information being transmitted. The purpose of the apparatus of the present invention is the development of test patterns to be employed in the alignment and performance analysis of television equipment, especially, closed circuit equipment and studio television equipment.

A number of signal patterns are employed in connection with such test work, such as the development of window signals of a predetermined size, the development of lines of various intensity and the development of bar patterns consisting of horizontal and vertical bars and combinations thereof and the development of dot patterns which consist of dots arranged in vertical and horizontal rows.

The present invention is particularly concerned with that part of the circuitry of a television test signal generator which produces the bar patterns and the dot patterns.

BRIEF SUMMARY OF THE INVENTION

The present invention concerns an apparatus in the form of a television test signal generator which is operable for developing complete reference signals to be employed for monitoring adjustment of television equipment, for testing and checking systems and the equipment and for other standard or desirable tests.

The apparatus comprises a source of signals that are normally encountered in televisions, including a sync signal, blanking signals, and horizontal and vertical control signals.

The aforementioned signals are utilized for controlling the final signal output of the apparatus and including in particular, the horizontal and vertical control signals so that test patterns such as horizontal and vertical lines for bars and combinations thereof and dot patterns can be developed. The particular circuitry with which the present invention is concerned employs multivibrators interconnected in controlling relationship to each other and under the further control of signals from the signal source to develop the desired output signals.

The foregoing objects as well as still other objects and advantages of the present invention will become more apparent upon reference to the following detailed description taken in connection with the accompanying drawings, in which.

DETAILED DESCRIPTION OF THE INVENTION

Figure 1:
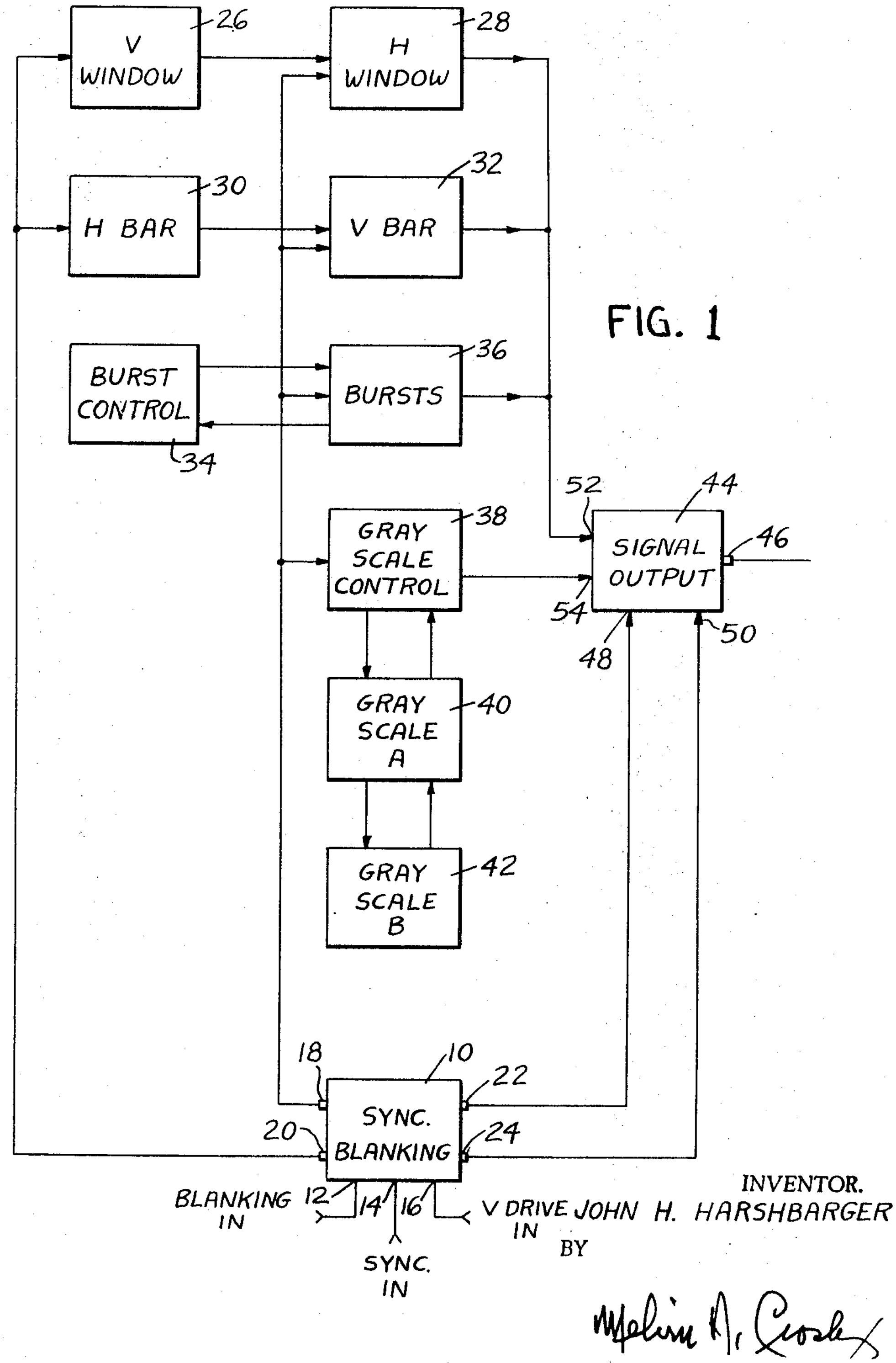
FIG. 1 is a schematic representation of a closed circuit television test signal generator according to the present invention.

Referring to the drawings somewhat more in detail, in FIG. 1, the circuitry of the apparatus is shown schematically in block form. A sync and blanking circuit is shown at 10 and receives input signals via terminals 12, 14 and 16 and supplies output signals at terminals 18, 20, 22 and 24.

The various components of the apparatus include a component at 26 for determining the vertical dimension of a test window and component 28 for determining the horizontal width of the test window. Such a test window can be white on black or vice versa.

Figure 2:
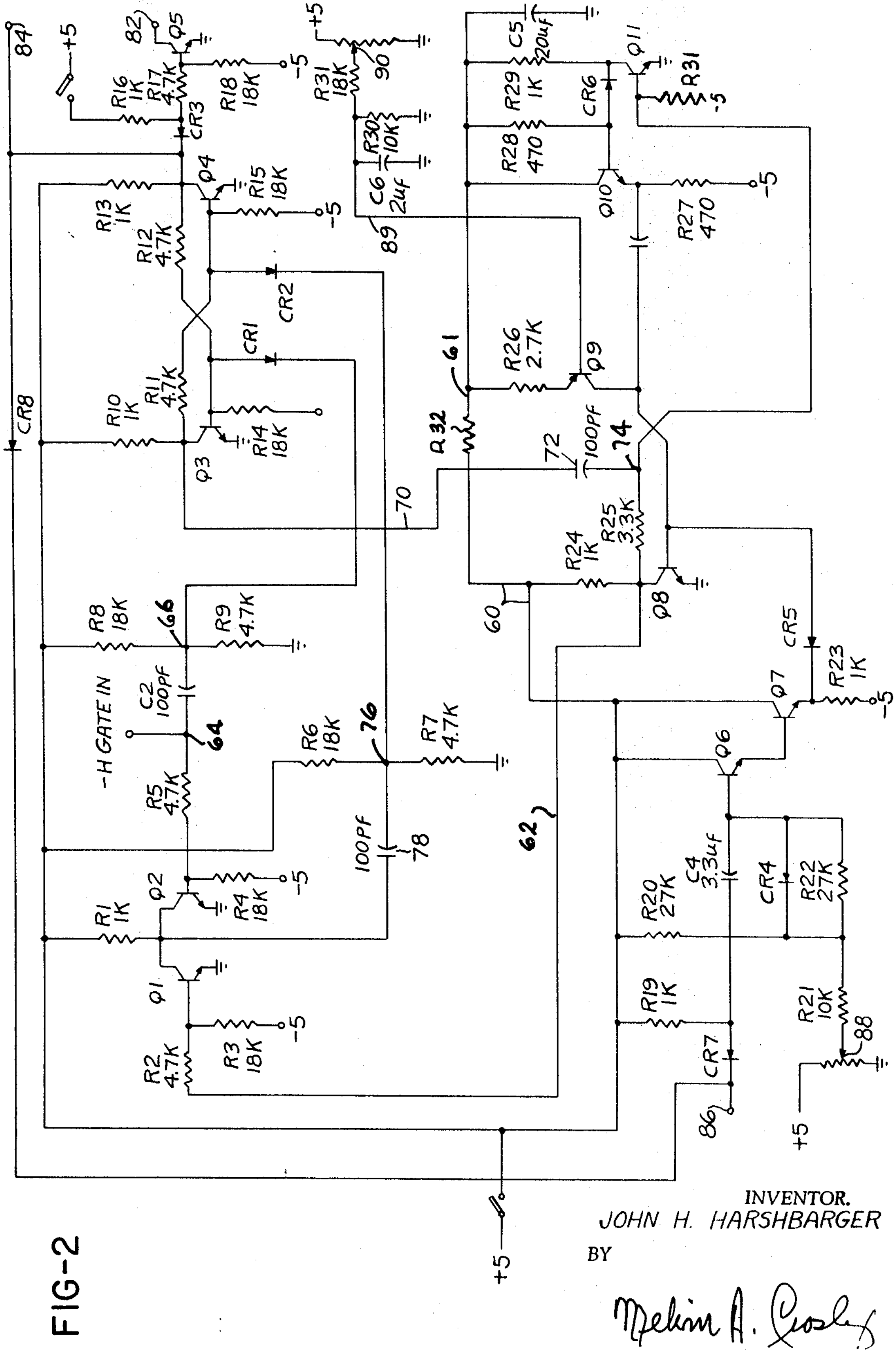
FIG. 2 is a schematic representation of the circuitry of one of the components of FIG. 1.

At 30 is shown one of the components which is illustrated more completely in FIG. 2 and which is referred to as an H-bar component and which controls the horizontal scanning line of the television raster. Another component 32, and which is illustrated more in detail in FIG. 3, determines the signals which will define vertical bars or dots in vertical rows on the television raster.

Components 34 and 36 are for the burst control and components 38, 40 and 42 pertain to the intensity of light produced on the screen and are referred to as grey scale control components. Finally, the component of 44 supplies signals at its terminal 46 to the equipment under test and receives input signals at terminals 48 and 50, from terminals 22 and 24 of component 10 and receives input signals at terminals 53 and 54 from the other components of the circuitry.

Switch means are provided, not illustrated, for determining which of the components 28, 32, 36 and 38 is to supply signals to the signal output board 44 and the switch means may also include contacts for interrupting the supply of power to the components not employed while supplying power to the components which are employed. In this manner, any component of the generator not being employed for testing purposes will not interfere with the operation of the components that are being employed.

Turning now to FIG. 2, which shows the H-bar board (component 30 of FIG. 1), the arrangement illustrated comprises a bistable multivibrator which operates in timed relation to the horizontal blanking pulses and which controls and is, in turn, controlled by a second vibrator in the form of a monostable vibrator which forms a timing component.

In FIG. 2, the collectors of a pair of transistors Q1 and Q2 are connected to +45 volt line 60 by resistor R1. Transistors Q1 and Q2 form a gate which is operated by signals supplied to the bases of transistors Q1 and Q2 and which is ineffective whenever transistor Q1 is conductive. The emitters of both of transistors Q1 and Q2 are connected to ground while the base of transistor Q1 is connected to −5 volt source by a resistor R3 and to the collector of a transistor Q8 of the monostable multivibrator via a resistor R2 and wire 62.

The base of transistor Q2 is connected to −5 volts via a resistor R4 and via a resistor R5 with a point 64 to which signals namely, horizontal blanking signals, are adapted to be supplied. Point 64 is connected through capacitor C2 to a point 66 which is connected by a resistor R8 with line 60 and through a resistor R9 to ground. Point 66 is also connected to the negative side of diode CR1, the positive side of which is connected to the base of a transistor Q3 and also through resistor R14 to the −5 volt source. The positive side of diode CR1 is also connected through resistor R12 to the collector of transistor Q4 and through resistor R13 with the +45 volt line 60.

The emitter of transistor Q3 is grounded and the collector thereof is connected to a point 68 which is connected to wire 60 through resistor R10 and to the base of transistor Q4 through resistor R11. Point 68 is also connected by wire 70 and capacitor 72 to point 74 which is connected to the collector of transistor Q8 and wire 62 by a resistor R25.

The aforementioned collector of transistor Q4 has its emitter grounded and its base connected through a resistor R15 with the −5 volt source and also to the positive side of a diode CR2, the negative side of which is connected to a point 76. Point 76 is connected to ground through resistor R7 and to the +5 volt line 60 through a resistor R6 and also to the collectors of the transistors Q1 and Q2 through a capacitor 78.

The collector of transistor Q4 connected to the negative side of a diode CR3, the positive side of which is connected through resistor R16 with switch terminal 80 adapted for being connected to a +5 volt source. The positive side of diode CR3 is connected through a resistor R17 with the base of a transistor Q5 at which base is also connected through resistor R18 to the −5 volt source. The emitter of transistor Q5 is grounded and the collector is connected to a signal output terminal 82.

Returning to transistor Q4, the collector thereof is connected to a signal output terminal 84 and to the positive side of a diode CR8, the negative side of which is connected to signal input terminal 86. Terminal 82 goes to ground when transistor Q5 goes conductive, which occurs when transistor Q4 goes nonconductive whereas, when transistor Q4 goes conductive, terminal 84 goes to ground.

Input terminal 86 is connected to the negative side of diode CR7, the positive side of which is connected through a resistor R19 with the +5 volt line 60 and also with the positive side of a capacitor C4, the negative side of which is connected to the base of a transistor Q6. The base of transistor Q6 is also connected to the positive side of another diode CR4, the negative side of which is connected by a resistor R20 with line 60. The negative side of diode CR4 is connected through a resistor R21 with the slider 88 of a resistor connected between +5 volts and ground. A still further resistor R22 is connected in parallel with diode CR4.

The collector of transistor Q6 is connected to line 60 and the emitter thereof is connected to the base of a transistor Q7,. The collector of transistor Q7 is connected to line 60 while the emitter is connected to the −5 volt source by a resistor R23. The emitter of transistor Q7 is also connected to the negative side of a diode CR5, the positive side of which is connected with the base of the aforementioned transistor Q8. The base of transistor Q8 is connected to the collector of a transistor Q9 and through a capacitor C7 with the emitter of a transistor Q10 which is also connected to the −5 volt source by a resistor R27.

Transistor Q9 is a PNP type transistor whereas all of the other transistors in the circuit of FIG. 2 are NPN type transistors.

The emitter of transistor Q9 is connected to line 60 by a resistor R26 and the base thereof is connected by a wire 89 to the positive side of a capacitor C6, the negative side of which is grounded and to one end of a resistor R30, the other end of which is grounded, and to one end of a resistor R31, the other end of which leads to a slider 90, adjustable along a resistance connected between +5 volts and ground.

Transistor Q10 has the collector thereof connected to a wire 92 which is connected to wire 61, which is also connected to the positive side of a capacitor C5, the negative side of which is grounded. Wire 61 is connected to wire 62 by resistor R32. Wire 92 is connected by resistor R28 with the base of transistor Q10 also which is connected with the positive side of a diode CR6, the negative side of which is connected with wire 92 through a resistor R29 and also with the collector of a transistor Q11. The emitter of transistor Q11 is grounded and the base thereof is connected by wire 94 with aforementioned point 74 and by a resistor R31 with the −5 volt source.

In the circuit of FIG. 2, when transistor Q8 becomes conductive, transistor Q1 goes nonconductive and this enables the gate consisting of transistors Q1 and Q2. Then, when a signal is supplied to point 64, the signal will be transmitted through capacitor 78 and diode CR2 to change the state of the bistable multivibrator consisting of transistors Q3 and Q4. The specific signal supplied to point 64 is the trailing edge of the horizontal blanking pulse. This is a positive going pulse and, therefore, makes transistor Q2 go conductive which will cause a negative going pulse to be supplied to the base of transistor Q4 to cause transistor Q4 to go nonconductive and transistor Q3 to go conductive.

The bistable multivibrator will remain in the last-mentioned state, namely, with transistor Q3 conductive, until the leading edge of the next horizontal blanking pulse is supplied to point 64. This signal, which is a negative going pulse, is now supplied through capacitor C2 and diode CR1 and returns the bistable multivibrator to its original state. This last-mentioned change of state in the multivibrator supplies a positive going signal through capacitor 72 to the base of transistor Q11 causing it to go to saturation and introducing a negative transition through diode CR6 to the base of transistor Q10 and causing a negative transition to be supplied through capacitor C7 to the base of transistor Q8 thereby causing it to go to nonconduction. When transistor Q8 goes to nonconduction, transistor Q1 will commence to conduct and the gate consisting of transistors Q1 and Q2 is now disabled so that further pulses to point 64 will have no effect on the bistable multivibrator consisting of transistors Q3 and Q4.

The length of time that transistor Q8 is not conductive is determined by the rate at which PNP transistor Q9 conducts so that resistor R26, transistor Q9, capacitor C7, and the adjustment of the slider 90 forms a timing circuit for measuring inactive intervals, namely, the length of time the transistor Q8 is nonconductive.

The signal developed at terminal 82 is employed, as will be seen hereinafter, to control the modulation of scanning lines and it will be apparent that a signal for modulating a scanning line will be caused by a signal at terminal 82 for the duration of one complete line only, namely, from the end of one horizontal blanking pulse to the beginning of the next.

Furthermore, it will be apparent that after one scanning line has been modulated, no further line will be modulated until the monostable multivibrator, of which transistor Q8 forms a part, will time out and again enable the gate consisting of transistors Q1 and Q2. The output signal at terminal 82 will thus cause modulation of selected horizontal lines of the raster thereby producing a pattern of horizontal lines on the television screen. The signal developed at terminal 84, on the other hand, can be employed to prevent modulation of scanning lines.

It is desired to modulate only certain spaced ones of the lines and while an obvious procedure would be to incorporate a counting circuit and count the number of lines between the modulated lines, due to the wide range of scanning rates encountered in industrial and closed circuit television systems, it is expedient to employ the timing circuit as described above so that a certain time delay occurs between modulated lines of the raster. Nevertheless, by the circuit arrangement illustrated in FIG. 2, one complete scanning line only at a time is modulated thereby to produce the dot and horizontal bar patterns.

The provision of transistor Q10 and diode CR6 in the circuit of FIG. 2 provides for a speedup in the operation of the system so that there is no delay in the starting of the timing cycle of the monostable vibrator consisting of transistors Q8 and Q11.

Adjustment of slider 90 is effective for giving a range of timing adequate for all situations encountered.

It is necessary to insure synchronization of the operation described above with the vertical interval. This is accomplished by the provision of transistors Q6 and Q7 and diode CR5 which, together with resistors R19, R20, R21 and R22, diodes CR7 and CR4 and capacitor C4, form a clamp circuit adapted for receiving negative pulses at terminal 86 and having a bias voltage adjustable by slider 88 moveable along a resistor connected between the 5 volts source and ground. A control pulse is supplied by the vertical blanking signal to terminal 86 and operation of the monostable timing circuit is interrupted by the control pulse at terminal 86 which will cause a negative excursion through diode CR5 to the base of transistor Q8. The delay in starting of the multivibrator at the end of a blanking pulse is determined by the setting of slider 88 while the period of the multivibrator is determined by the setting of slider 90.

If, during the vertical blanking interval, the first line of the raster is intensified, it is of no consequence because this will be deleted by the blanking circuitry consisting of diode CR8 which is also connected to the negative side of diode CR7.

Figure 3:
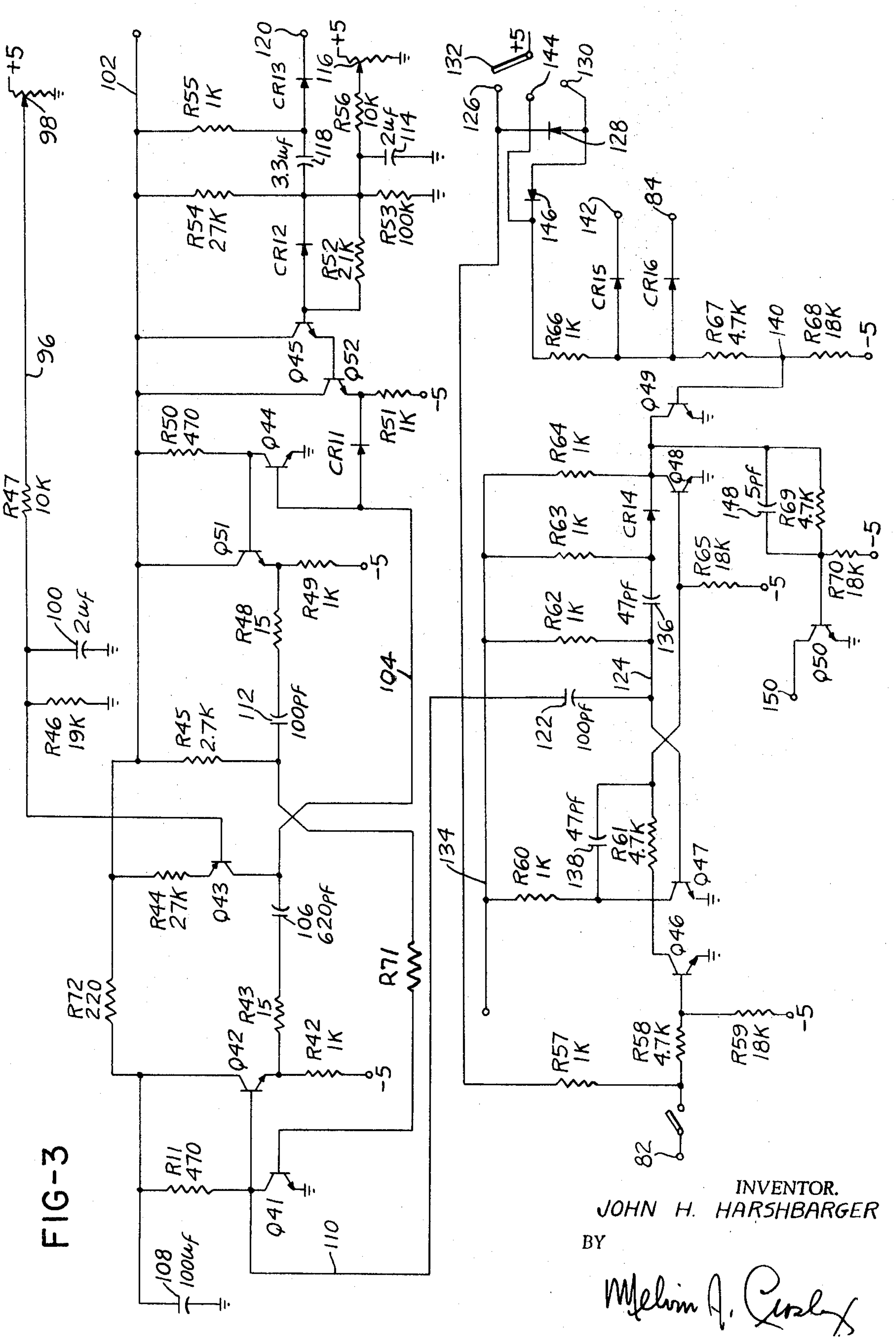
FIG. 3 shows the circuitry pertaining to another of the components of FIG. 1.

The horizontal elements for the test patterns are developed by the circuit of FIG. 2 described above, while the vertical elements are developed in the circuit of FIG. 3. FIG. 3 comprises a free-running multivibrator which will supply several signals during the interval of one scanning line and this multivibrator is connected in circuit with another vibrator in the form of a monostable multivibrator so that the vertical elements can be developed in each scanning line to produce vertical bars on the screen or in only selected spaced ones of the scanning lines in order to produce dots on the television screen.

In FIG. 3 the free running multivibrator consists of transistors Q41 and Q44 with auxiliary transistors Q42, Q43 and Q51 associated therewith. Transistor Q43 is a PNP type and the others of the transistors are NPN types. Further transistors in the form of NPN transistors Q52 and Q45 are also provided.

A wire 96 connected to a slider 98 adjustable along a resistor connected between +5 volts and ground is connected through a resistor R47 with the base of transistor Q43 and through a resistor R46 to ground and through a capacitor 100 to ground.

A wire 102, which is normally at +5 volts, is connected through a resistor R44 with the emitter of transistor Q43. The collector of transistor Q43 is connected to a wire 104 leading to the base of transistor Q44. Wire 104 is also connected through a capacitor 106 and a resistor R43 with the emitter of transistor Q42 and to the −5 volt source through a resistor R42. The collector of transistor Q42 is connected to wire 102 through resistor R72, to ground through a capacitor 108, and through a resistor R41 to the collector of transistor Q41 and also to a wire 110. Wire 110 is also connected to the base of transistor Q42.

The base of transistor Q41 is connected through a resistor R71 with one end of a resistance R45, the other end of which is connected to wire 102. The point between resistors R71 and R45 is connected through a capacitor 112 and a resistance R48 with the emitter of transistor Q51 and through a resistor R49 with the −5 volt source. The collector of transistor Q51 is connected to wire 102 and the base thereof is connected to the collector of transistor Q44 which is also connected by resistor R50 with wire 102. The emitter of transistor Q44 is grounded and the base, in addition to being connected to wire 104, is connected to the plus side of a diode CR11, the negative side of which is connected to the emitter of transistor Q52 and by resistor R51 with the negative 5 volt source.

The collector of transistor Q52 is connected to wire 102 and the base is connected to the emitter of transistor Q45. The collector of transistor Q45 is connected to wire 102 and the base is connected to the plus side of a diode CR12, the negative side of which is connected through resistor R54 with wire 102. A resistor R52 is connected in parallel with CR12 and the negative end of diode CR12 is connected to ground through a resistor R53. The negative side of diode CR12 is also connected to ground through a capacitor 114 and through a resistor R56 with a slider 116 adjustable along a resistance connected between a +5 volt source and ground.

The negative side of diode CR12 is further connected through a capacitor 118 and a resistor R55 with wire 102 and to the positive side of a diode CR13, the negative side of which is adapted to receive negative H pulses from a terminal 120. Transistor Q52 and diode CR11 form a clamp circuit similar to the one connected to the base of Q8 in FIG. 2 and receives blanking pulses at input terminal 120 while an adjustable bias voltage is supplied from slider 116, adjustment of slider 116 determines how soon the multivibrator will start running after the end of the blanking pulse while the period of the multivibrator is determined by the adjustment of slider 98 which controls the charging circuit for capacitor 106.

The aforementioned wire 110 leads through a capacitor 122 to a wire 124 which has one end connected to the base of a transistor Q47, the emitter of which is grounded.

The collector of transistor Q47 is connected to the collector of a transistor Q46 which has its emitter grounded and its base connected through a resistor R59 with the negative 5 volt source and through a resistor R58 to a terminal adapted for connection to terminal 82 of the circuit of FIG. 2. The end of resistor R58 opposite the base of transistor Q46 is connected through a resistor R57 with a switch terminal 126 which leads to the negative side of a diode 128, the positive side of which is connected to another switch terminal 130. Switch terminal 130, as well as switch terminal 126, is adapted for selective engagement by switch blade 132 which is connected to a +5 volts source. A signal at terminal 82 of FIG. 3 is operable for saturating Q46 only when blade 132 is closed on one of terminals 126 or 130.

The collectors of transistors Q46 and Q47 are connected by a resistor R60 with a +5 volts wire 134.

Wire 134 is connected by resistor R62 with wire 124 and the point of connection of resistor R62 with wire 124 is connected by a capacitor 136 with one end of a resistor R63, the other end of which is connected with wire 134 and also with the positive side of a diode CR14, the negative side of which is connected to the collector of a transistor Q48 which has its emitter grounded. The collector of transistor Q48 is also connected by resistor R64 with wire 134.

The base of transistor Q48 is connected by a resistor R65 with the −5 volts source and also through a resistor R61 with the collectors of transistors Q46 and Q47. A capacitor 138 is connected in parallel with resistor R61.

The collector of transistor Q48 is connected to the collector of transistor Q49 which has its emitter grounded and which has its base connected to a point 140. Point 140 is connected through resistor 68 to −5 volts and through resistor R67 to the plus side of a diode CR16, the negative side of which is adapted for connection to terminal 84 of FIG. 2. The positive side of diode CR16 is also connected to the positive side of a diode CR15, the negative side of which is connected to a terminal 142, adapted for receiving negative V pulses.

The positive sides of diodes CR15 and CR16 are also connected through a resistor R66 with a switch terminal 144 on which switch blade 132 is adapted for closing. Terminal 144 is connected to the negative side of a diode 146, the positive side of which is connected to the aforementioned terminal 130.

Returning to transistors Q48 and Q49, the collectors thereof are connected through a resistor R69 with the base of the transistor Q50 which has its emitter grounded. Resistor R69 is bypassed by a capacitor 148 and the collector of the transistor is connected to a signal output terminal 150. Q50 represents the source of modulating signals, or voltage, and when conductive prevents the supply of a modulating signal, and when nonconductive, causes the supply of a modulating signal.

In operation, when enabling voltages are supplied at sliders 98 and 116 and to wire 102, the free running multivibrator will commence running and triggers will be fed continuously through capacitor 122 to the monostable vibrator consisting of transistors Q47 and Q48. This will normally cause pulse to appear at terminal 150 pertaining a transistor Q50 to develop signals for modulating the scanning lines at spaced points therealong. Q50 is in conductive, no signal, condition during the stable state of the monostable multivibrator and goes to its conductive, signal, state during the instable state of the multivibrator.

The multivibrator consisting of transistors Q47 and Q48, however, can be inhibited by saturation of transistor Q46 or by saturation of transistor Q49. Saturation of Q46 will prevent signals to output terminal 150 while saturation of Q49 will permit a continuous signal to output terminal 150. Transistor Q46 will go to saturation when 5 volts is supplied to resistor R57 and the output terminal 82 of FIG. 2 is then supplied to the juncture of resistors R57 and R59. Under these circumstances, the monostable multivibrator consisting of transistors Q47 and Q48 is enabled only during selected scanning lines and in this manner will develop a dot pattern on the television screen. When the upper end of resistor 66 is made positive, Q49 will saturate during the selected scanning lines and will cause modulation of the entire line and thereby develop horizontal bars on the raster.

Vertical bars are developed on the television screen by generating the V elements in each and every scanning line, namely, by developing a plurality of elements at output terminal 150 for each of the scanning lines as commanded by the signals supplied through capacitor 122. To develop vertical lines, no voltage is supplied through diode 146 to the upper end of resistor R66 and likewise no voltage is supplied through diode 128 to the upper end of resistor R57. Thus, neither transistor Q48 or transistor Q49 will go to saturation and the monostable multivibrator will be enabled continuously and will cause a supply of signals during each scanning line to output terminal 150.

OPERATION

The combination of circuitry, as shown in FIGS. 2 and 3, is used in combination to develop either the H Bar, V Bar, Dot, or H plus V Bar (Crosshatch) television test patterns. Switching from one pattern to another is accomplished merely by manipulation to DC control voltages, eliminating the cabling of signals and thereby preventing degradation commonly encountered in ordinary switching situations.

As noted previously, horizontal elements are developed in circuitry as shown in FIG. 2. The circuitry as shown in FIG. 3 develops the basic V elements, and also contains the logic circuits necessary for generation of the individual patterns. Basic triggers, establishing rate at which vertical elements will be presented in the horizontal line, are routed from multivibrator Q41, Q44 via capacitor 122 to the monostable multivibrator made up by transistors Q47 and Q48 (FIG. 3). This circuit generates the basic width of element to be used and is controlled by transistors Q46 and Q49 to develop the particular pattern desired.

To develop a dot pattern the V elements are generated only in a few appropriately spaced television scanning lines. The triggers for vertical element generation rate are fed through capacitor 122 at all times.

However, the monostable multivibrator Q47, Q48 is inhibited whenever Q46 is saturated. This condition, saturation of Q46, occurs only when a positive control voltage is applied to resistor R57, namely, with blade 132 closed on terminal 126, and then the level at the junction of R57 and R58 is modulated by the output of the circuit of FIG. 2 taken from terminal 82 thereof. Thus, the V elements are enabled only during selected scanning lines, namely, whenever transistor Q46 of FIG. 3 is not saturated and which occurs when Q5 of FIG. 2 is not saturated.

V Bars are developed by generating the V elements in each and every scanning line. Therefore, neither Q46 or Q49 are permitted to saturate, whereby monostable Q47, Q48 operates at all times in the active raster, as commanded by capacitor 122. There is no voltage applied to any of terminals 126, 130 or 144 of FIG. 3 and, for all practical purposes, the circuit of FIG. 2 is not required for this pattern only.

H Bars only are generated by activation of both Bar and Dot control voltages by closing blade 132 on terminal 144 of the V Bar Board (FIG. 3). In essence, this locks out the V Bar generation, and gates the input properly to modulate entire scanning lines at selected intervals. The basic H element from FIG. 2, terminal 84 is submitted via terminal 84 of FIG. 3 to the base of Q49 of FIG. 3, saturating the transistor and forcing a positive excursion at the output terminal 150, at the collector of Q50. The opposite polarity of H output is developed at terminal 82 of of FIG. 2, and this signal is submitted via terminal 82 of FIG. 3 to saturate transistor Q46, thereby inhibiting monostable Q47, Q48 at all other times.

The Bar pattern, often referred to as a Crosshatch, represents a combination of V and H elements. In general, the V generation is permitted to operate at all times (Q47, Q48). At the proper time the H element is superimposed, causing continuous modulation of an entire television line. Selection of the Bar pattern is accomplished by introduction of a DC control voltage at terminal 144 of FIG. 3. The horizontal elements, as generated in the circuit of FIG. 2 and fed out via terminal 84 to terminal 3, cause transistor Q49 to be saturated during selected lines, forcing continuous cut off of Q50 for the entire television line to form horizontal bars, while Q46 is prevented from going to saturation and permits modulating signals in every line to form vertical bars.

The vertical bar element location is generated in the astable multivibrator of FIG. 3 employing transistors Q45, Q52, Q42 and Q51. The circuit includes R72 and capacitor 108 which effectively lowers the positive voltage provided to half of the astable multivibrator timing circuit. This is done to extend the control range achieved by the control circuit Q45, Q52, and CR11. The measuring technique requires that, in generation of a bar or dot pattern, the pattern elements have sufficient range to "overlap" themselves; that is, the adjustment range will permit movement of a particular element to at least meet and perhaps exceed the original position of an adjacent element. This is to insure that electrically generated pattern elements can be adjusted to match a physical reference pattern (overlay) on a display or camera tube surface regardless of the position of the physical overlay.

Reduction of B+ voltage to transistors Q41 and Q42 reduces the amplitude of pulse developed at the collector of transistor Q41 and presented to capacitor 106 and the charging network constituted of R44 and Q43. Therefore, the sawtooth amplitude presented at the base of Q44 is significantly smaller than the control range available at the emitter of transistor Q52. Note that the basic control voltage as introduced at slider 116 in this form of the circuit is form 0 to +5 volts, and is attenuated by resistors R54, R53 and R56 to provide an appropriate control range; the collector voltage for Q41 is dropped by resistor R72 to approximately +3.5 volts.

Since the resultant range available at the emitter of Q52 is greater than the sawtooth amplitude at the base of Q44, the voltage can be clamped at a level in the negative direction exceeding the negative excursion of the sawtooth in normal operation. Therefore, a delay longer than the normal operational cycle of the multivibrator is introduced, shifting the pattern potentially a greater distance than would be achieved in normal operation of the circuit.

Horizontal elements of the pattern are developed by similar circuitry as shown in FIG. 2, with the range extension elements being shown there as resistor R32 and capacitor C5. These apply in the same fashion as described above to the multivibrator formed by transistors Q8, Q9 and Q11. In this case the control range is formed by resistors R20, R21 and R22.

Figures 4, 5:
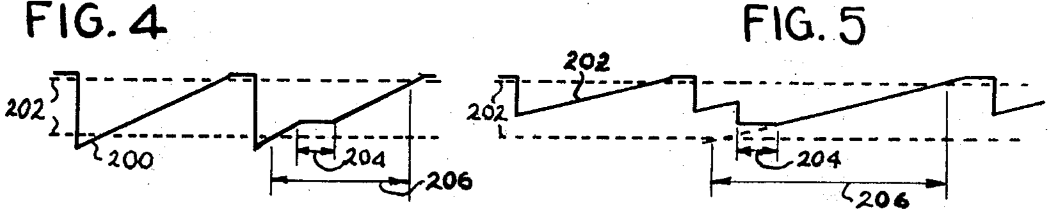
FIG. 4 shows a control range possible in known arrangements.
FIG. 5 shows a control range possible in the instrument of the present invention.

FIGS. 4 and 5 graphically illustrate an important feature of the present invention. FIGS. 4 and 5 can be taken to represent the voltage supply to the base of transistor Q8 in FIG. 2, or Q44 in FIG. 3 when voltage dropping resistors R32 and R72 are not in the circuits. The voltage line is indicated by reference numeral 200, while the vertically spaced dotted lines 202 illustrate the possible range in the control, or clamp, voltage supplied to the base of Q8 through CR5 and to Q44 through CR11. The interval marked at 204 is the clamping interval and the interval marked at 206 is the possible control range afforded by clamp voltage 202.

It will be noted in FIG. 4 that the control range is substantially less than the period of the pertaining multivibrator, only about 80 percent of the total period. This is due to the fact that the negative excursion at the base of the transistor of the multivibrator during multivibrator operation is greater than the range of the control voltage.

Turning now to FIG. 5, which shows the improvement obtained by use of the voltage-dropping resistors R32 and R72, the line 202, as before, represents the excursion of the voltage at the base of Q8 or Q44 during multivibrator vibration and the spaced dotted lines 202 represent the range of control, or clamp, voltage. Numeral 204 again represents the clamping interval and numeral 206 the control range.

It will be noted in FIG. 2 that the range of control voltage is greater than the negative excursion at the base of the transistor during multivibrator vibration and that the total control range therefore extends to about 150 percent of the period of the multivibrator. The inclusion of the voltage dropping resistors thus permits adjustment of the pattern elements on the screen a distance greater than the spacing between the elements so that the developed pattern can always be shifted to exactly the desired position, whereby it can be brought, for example, into exact conformity with a mechanical overlay.

It will be understood that modifications can be made within the scope of the appended claims.

What I claim is:

1. A television test instrument for developing test patterns on a television raster under the control of horizontal and vertical blanking pulses, said instrument comprising; signal-developing means operable when actuated to supply a modulating signal for modulating the scanning lines of a television raster, a first multivibrator connected to said signal developing means in controlling relation thereto, a second multivibrator connected in controlling relation to said first multivibrator, said second multivibrator having a period a fraction of the duration of a scanning line whereby to be operable to control said first multivibrator to actuate said signal developing means to develop a plurality of said modulating signals during a scanning line, said second multivibrator comprising an astable multivibrator having first and second components each with an output terminal and a control terminal, a capacitor connecting the control terminal of each component with the output terminal of the other component, a charging circuit for each capacitor and at least the charging circuit for the capacitor connected to the control terminal of said first component being adjustable for controlling the period of said second multivibrator and thereby controlling the operation of said first multivibrator and the horizontal spacing between successive modulating signals from said signal-developing means, a clamp circuit having an input terminal and connected to the control terminal of said first component and operable upon the supply of a pulse of one polarity to said input terminal to supply a voltage to said second multivibrator of a polarity to clamp it in off condition, a supply of voltage connected to said components, said supply of voltage being connected to said clamp circuit to supply bias voltage thereto opposite in polarity to said pulses and means for adjusting said bias voltage, and voltage dropping means in series with said second component for reducing the voltage at the said output terminal thereof thereby to increase the range of control afforded by adjustment of the said bias voltage of said clamp circuit.

2. A television test instrument according to claim 1 in which the said pulses supplied to said input terminal of said clamp circuit are blanking pulses whereby the said modulating signals are initiated in the same lateral position along each scanning line to which modulating signals are supplied.

3. A television test instrument according to claim 2 which includes a diode connecting said clamp circuit to said control terminal of said first component of said second multivibrator whereby said clamp circuit influences said second multivibrator only when a said pulse is supplied to the input terminal of said clamp circuit.

4. A television test instrument according to claim 3 in which said first multivibrator is a monostable multivibrator and causes said signal developing means to develop a signal only when said first multivibrator is in its instable state, and first and second control elements connected to said first multivibrator and each operable when actuated to clamp said first multivibrator in a respective state thereof thereby to clamp said signal developing means in actuated and nonactuated position thereof respectively.

5. A television test instrument according to claim 4 in which said first control element is operable to clamp said first multivibrator in its stable state and said second control element is operable to clamp said first multivibrator in its instable state, and control means selectively operable for supply a first actuating signal to said first control element during the interval of a predetermined number of scanning lines and for interrupting said first actuating signal for the duration of a single scanning line only at the end of each said interval to cause modulating signals to be developed only on said single lines of the raster thereby to develop a pattern of horizontally and vertically opposed dots on said raster.

6. A television test instrument according to claim 5 in which said control means is selectively operable for supplying a second actuating signal to said second control means for the duration of said single lines only thereby to develop vertically opposed horizontal lines on said raster.

7. A television test instrument according to claim 6 in which said control means comprises a monostable third multivibrator a bistable fourth multivibrator so interconnected that in one state thereof said third multivibrator triggers said fourth multivibrator into the instable state thereof and said fourth multivibrator while in the instable state thereof clamps said third multivibrator in its said one state, said third multivibrator having first and second terminals at which said first and second control signals are developed in respective states of said third multivibrator.

8. A television test instrument according to claim 7 in which said third multivibrator has a trigger terminal to which horizontal blanking pulses are supplied and the opposite edges of which trigger said third multivibrator into opposite states thereof, the leading edge of a said horizontal blanking pulse triggering said third multivibrator into the said one state thereof and thereby causing triggering of said fourth multivibrator into the instable state thereof, the period of said fourth multivibrator being equal to the interval between said single lines of the raster.

9. A television test instrument according to claim 8 in which said fourth multivibrator has third and fourth components each with an output terminal and a control terminal, a capacitor connecting the output terminal of said third component to the control terminal of said fourth component, a charging circuit connected to said capacitor and adjustable to adjust the period of said fourth multivibrator thereby to adjust the period of time said third multivibrator remains in its said one state, said third multivibrator supplying first control signals to said first terminal when in said one state and second control signals to said second terminal when in the other state, a further capacitor connecting the control terminal of said third component to said third multivibrator to receive trigger pulses therefrom, said source of voltage being connected to said components, voltage-dropping means serially connected with said third component for reducing the voltage at the output terminal thereof, a second clamp circuit connected to the control terminal of said fourth component and having an input terminal and operable upon the supply of a pulse thereto to clamp said fourth multivibrator in the instable state thereof, said source of voltage being connected to said second clamp circuit to supply bias voltage thereto of a polarity opposite to that of said pulse and means for adjusting said bias voltage.

10. A television test instrument according to claim 9 in which the pulse supplied to the input terminal of said second clamp circuit is the vertical blanking pulse.

11. A television test instrument according to claim 12 which includes a diode connecting said input terminal of said second clamp circuit to said third multivibrator and operable to said third multivibrator from going to its said one state during vertical blanking.

12. A television test instrument according to claim 11 which includes gates connecting said first and second terminals of said fourth multivibrator to said first and second control elements of said first multivibrator, said gates having control terminals and being enabled to pass signals only upon the supply of voltage to the said control terminals thereof, and means for selectively supplying enabling voltage to the said control terminals of said gates.

13. A television test instrument according to claim 1 in which said voltage-dropping means, in series with said second component, is a resistor.

14. A television test instrument according to claim 9 in which said voltage-dropping means, in series with said third component, is a resistor.